(12) United States Patent
Rotter et al.

(10) Patent No.: US 9,199,417 B1
(45) Date of Patent: Dec. 1, 2015

(54) SYSTEMS AND METHODS FOR ASSEMBLING STIFFENED COMPOSITE STRUCTURES

(71) Applicant: The Boeing Company, Seal Beach, CA (US)

(72) Inventors: Daniel M. Rotter, Lake Forest Park, WA (US); Jennifer Sue Noel, Kent, WA (US); Brian G. Robins, Renton, WA (US); Kimberlee Madden, Redmond, WA (US); Henry Macias, Auburn, WA (US); Brad A. Coxon, Everett, WA (US); Stephen K. Kirchmeier, Bothell, WA (US); Joseph D. Anderson, Seattle, WA (US); Kurtis S. Willden, Kent, WA (US)

(73) Assignee: The Boeing Company, Chicago, IL (US)

( * ) Notice: Subject to any disclaimer, the term of this patent is extended or adjusted under 35 U.S.C. 154(b) by 388 days.

(21) Appl. No.: 13/732,961

(22) Filed: Jan. 2, 2013

(51) Int. Cl.
*B29C 70/30* (2006.01)
*B29D 99/00* (2010.01)

(52) U.S. Cl.
CPC ............ *B29C 70/30* (2013.01); *B29D 99/0014* (2013.01); *B29D 99/0025* (2013.01)

(58) Field of Classification Search
None
See application file for complete search history.

(56) References Cited

U.S. PATENT DOCUMENTS

| | | | |
|---|---|---|---|
| 4,980,013 | A | 12/1990 | Lowrey |
| 7,597,772 | B2 * | 10/2009 | Martinez Cerezo et al. . 156/169 |
| 2009/0320292 | A1 | 12/2009 | Brennan et al. |
| 2010/0239865 | A1 * | 9/2010 | Kallinen ..................... 428/411.1 |
| 2013/0036922 | A1 * | 2/2013 | Stewart et al. .................. 100/35 |

OTHER PUBLICATIONS

U.S. Appl. No. 13/626,452, filed Sep. 25, 2012, Robins et al.

* cited by examiner

*Primary Examiner* — Barbara J Musser
(74) *Attorney, Agent, or Firm* — DASCENZO Intellectual Property Law, P.C.

(57) ABSTRACT

Methods of assembling a stiffened composite structure include loading, with a stiffener loading tool, a respective stiffener from a supply of stiffeners onto an inner mold line layup mandrel; repeating the loading to load a plurality of stiffeners onto the inner mold line layup mandrel; and following the repeating, affixing a respective skin segment from a supply of skin segments to the plurality of stiffeners loaded on the inner mold line layup mandrel to form at least a portion of the stiffened composite structure. Systems for assembling stiffened composite structures include a supply of stiffeners; an inner mold line layup mandrel; and a stiffener loading tool configured to load the respective stiffener onto the inner mold line layup mandrel.

28 Claims, 5 Drawing Sheets

SYSTEMS AND METHODS FOR ASSEMBLING STIFFENED COMPOSITE STRUCTURES

FIELD

The present disclosure relates to the assembly of stiffened composite structures.

BACKGROUND

Stiffened composite structures are structures that are constructed of composite materials, such as fiber reinforced composite materials, and typically include some form of structural frame that carries a skin. Some modern aircraft fuselages are examples of stiffened composite structures that include a skin operatively coupled to frame members that extend circumferentially around and that are spaced longitudinally along the inside of the fuselage and stringers that extend longitudinally along and that are spaced circumferentially around the inside of the fuselage. Typically, stiffened composite fuselages are constructed utilizing an inner mold line layup mandrel that includes stringer cavities, or forms, that extend longitudinally along the mandrel. To prepare the mandrel, resin may be hand-applied to the stringer cavities, and stringers may be hand-aligned into position in the stringer cavities. After several stringers have been placed in respective stringer cavities, they are vacuum compacted in batches, utilizing a gas-impermeable flexible sheet of material that extends across the outer surface of the mandrel and that is sealed to the mandrel around the outer perimeter of the stringers that are being compacted. A vacuum is then applied between the sheet of material and the mandrel to compress the stringers to the mandrel. This process is referred to in the aerospace industry as "bagging." The bagging and compacting process can be labor and time intensive.

SUMMARY

Systems and methods for assembling stiffened composite structures are disclosed herein. Methods according to the present disclosure include providing a supply of stiffeners; providing a supply of skin segments; loading, with a stiffener loading tool, a respective stiffener from the supply of stiffeners onto an inner mold line layup mandrel; repeating the loading to load a plurality of stiffeners onto the inner mold line layup mandrel; and following the repeating, affixing a respective skin segment from the supply of skin segments to the plurality of stiffeners loaded on the inner mold line layup mandrel to form at least a portion of the stiffened composite structure. Systems according to the present disclosure include a supply of stiffeners; an inner mold line layup mandrel; and a stiffener loading tool configured to load the respective stiffener onto the inner mold line layup mandrel.

DESCRIPTION

Figure 1:
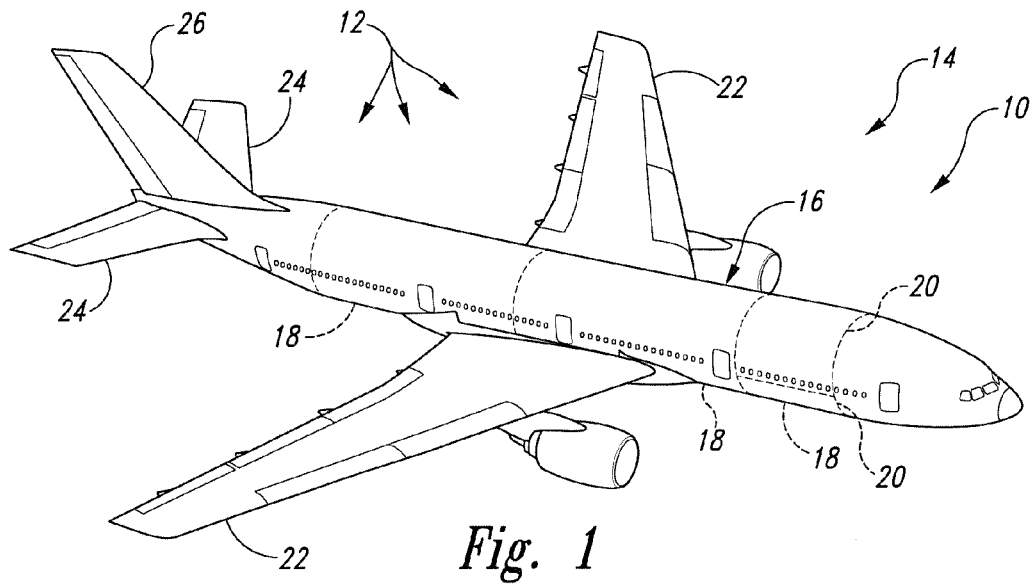
FIG. 1 is a perspective view of an illustrative, non-exclusive example of a stiffened composite structure in the form of an aircraft.

Methods and systems for assembling stiffened composite structures, as well as stiffened composite structures themselves and apparatuses constructed of stiffened composite structures, are disclosed herein. In FIG. 1, an example of an apparatus 10 that may be constructed from stiffened composite structures 12 is provided in the form of an aircraft 14; however other apparatuses 10 are within the scope of the present disclosure, and the present disclosure is not limited to aircraft and aircraft applications. For example, as illustrative, non-exclusive examples, other apparatuses 10 that may be constructed of stiffened composite structures 12 include (but are not limited to) spacecraft, watercraft, land vehicles, wind turbines, structural towers and masts, etc. Moreover, aircraft 14 may take any suitable form, including commercial aircraft, military aircraft, private aircraft, or any other suitable aircraft. While FIG. 1 illustrates aircraft 14 in the form of a fixed wing aircraft, other types and configurations of aircraft are within the scope of aircraft 14 according to the present disclosure, including (but not limited to) helicopters.

Aircraft 14 include a fuselage 16, which generally corresponds to the main body of the aircraft 14 for holding passengers, crew, cargo, and/or equipment, for example, depending on the particular configuration and/or function of an aircraft 14. Typically, although not required, the fuselage 16 of an aircraft 14 is elongate and somewhat cylindrical or tubular. In some embodiments, the fuselage 16 may be constructed of multiple sections 18 that are longitudinally spaced along the fuselage 16 and operatively coupled together to define the fuselage 16. As used herein when referencing an aircraft 14, a fuselage 16, and/or a corresponding stiffened composite structure 12, the longitudinal direction refers to the fore-aft direction, corresponding to a longitudinal, or long, axis, of the fuselage 16. Additionally, the terms "inner" and "outer" when used in connection with an aircraft 14, a fuselage 16, and/or a corresponding stiffened composite structure 12 refer to the radially inward side and the radially outward side, respectively, of the corresponding stiffened composite structure. Accordingly, the outer side of a fuselage 16 or a component part thereof generally faces away from the fuselage 16, and the inner side of a fuselage 16 or a component part thereof generally faces the internal volume that is defined by the fuselage 16. Similar relative terms may be used with respect to stiffened composite structures 12 other than fuselages 16 and with respect to apparatuses 10 other than aircraft 14.

In FIG. 1, three fuselage sections 18 are indicated schematically; however, any number or size and shape of sections 18 may be used to construct a fuselage 16. Sections 18 additionally or alternatively may be referred to as barrel sections 18 of a fuselage 16, with each barrel section 18 generally defining a length of the fuselage 16. Additionally or alternatively, as schematically illustrated in FIG. 1, a section 18 may include, or be constructed of, more than one subsection 20. In the schematically illustrated and optional example of FIG. 1, a section 18 is shown schematically and optionally to include an upper subsection 20 and a lower subsection 20; however, a section 18 may be constructed of any suitable number, configuration, and placement of subsections 20, including no subsections 20 at all.

Aircraft 14 also may include wings 22, horizontal stabilizers 24, and a vertical stabilizer 26, each of which may be constructed as a unitary structure or in subsections that are subsequently assembled together. One or more of a fuselage 16, a fuselage section 18, a fuselage subsection 20, a wing 22, a horizontal stabilizer 24, a vertical stabilizer 26, or a structural subsection thereof may be constructed of and/or may be described as a stiffened composite structure 12 according to the present disclosure.

Figure 2:
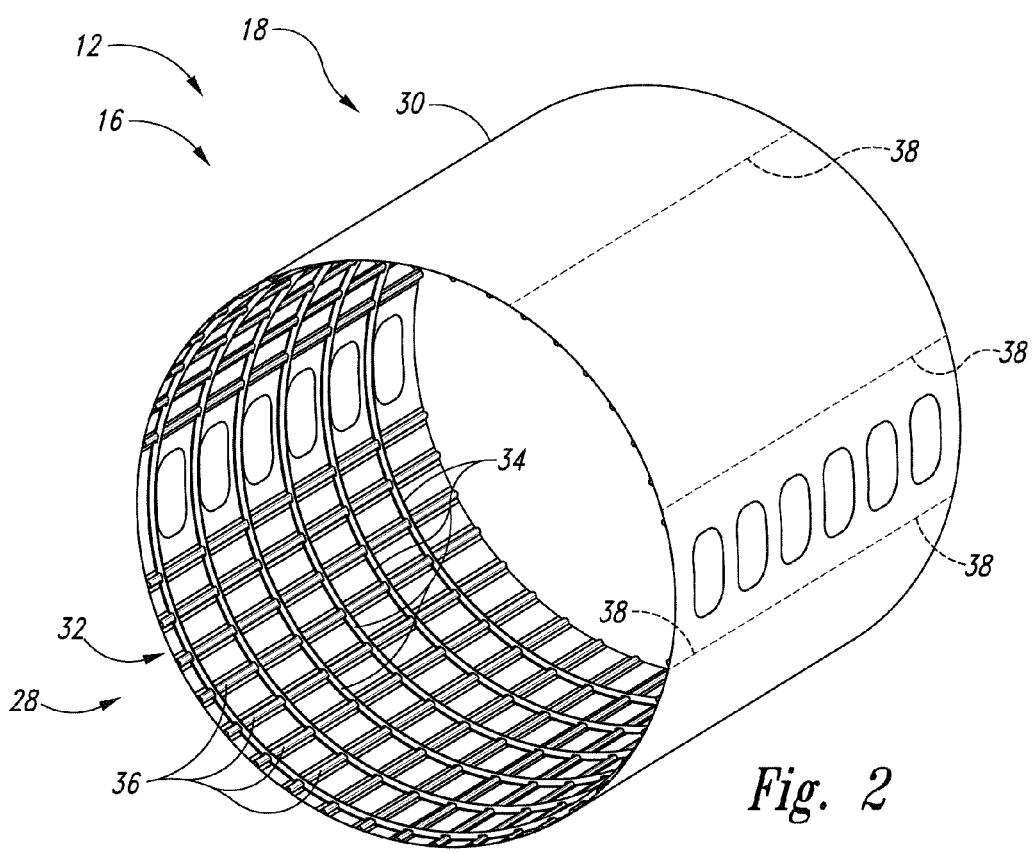
FIG. 2 is an isometric view of an illustrative, non-exclusive example of a stiffened composite structure in the form of a barrel section of an aircraft.

Stiffened composite structures 12 according to the present disclosure generally encompass structures that are defined by a structural frame 28 and a skin 30 that is operatively coupled to and supported by the structural frame 28. FIG. 2 depicts an illustrative, non-exclusive example of a stiffened composite structure 12 in the form of a barrel section 18 of a fuselage 16 of an aircraft 14. The skin 30 may be described as defining the outer shape of the fuselage 16. As indicated in FIG. 2, structural frames 28 include a plurality of stiffeners 32 operatively coupled to the skin 30. In the example of fuselage 16, the stiffeners 32 include a plurality of frame members, or frames, 34 that are operatively coupled to and that extend circumferentially around the inner side of the skin 30 and that are spaced longitudinally along the fuselage 16. The stiffeners 32 also include a plurality of stringers 36 that are operatively coupled to and that extend longitudinally along the inner side of the skin 30 and that are spaced circumferentially around the fuselage 16. In some embodiments of stiffened composite structures 12, although not required, the skin 30 may be constructed of a plurality of skin segments 38 that collectively define the skin 30, or at least a portion of the skin 30 of a stiffened composite structure 12.

Figure 3:
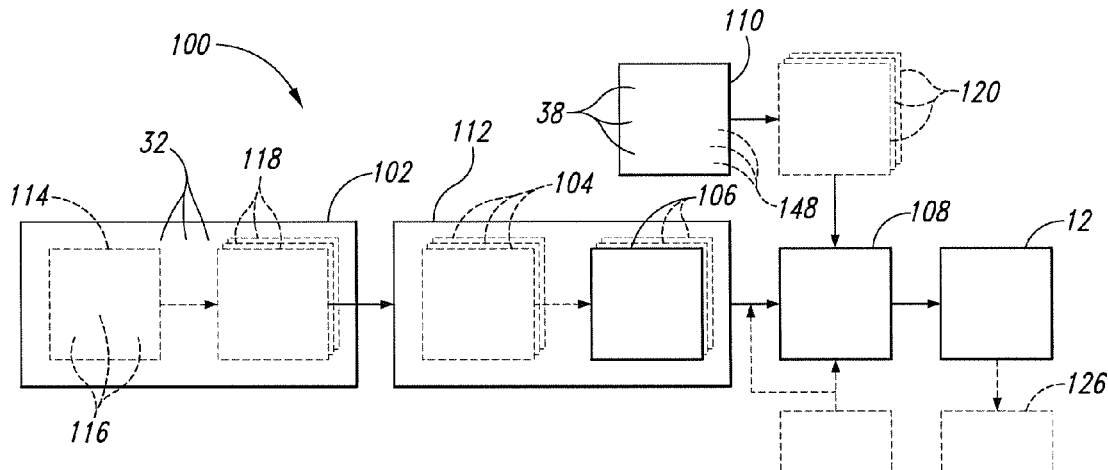
FIG. 3 is a schematic diagram representing systems for assembling stiffened composite structures.
Figure 4:
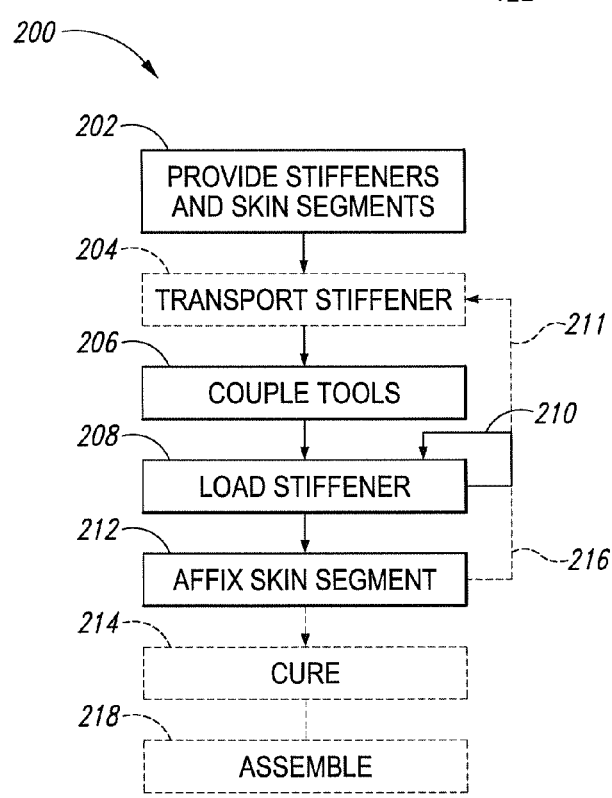
FIG. 4 is a flowchart schematically representing methods of assembling stiffened composite structures.

FIG. 3 provides a schematic representation of illustrative, non-exclusive examples of systems 100 for assembling composite structures 12, FIG. 4 provides a flowchart schematically representing illustrative, non-exclusive examples of methods 200 for assembling composite structures 12, and FIGS. 5-12 provide somewhat less schematic but still illustrative, non-exclusive examples of component parts of systems 100, such as that perform and/or are utilized in connection with the performance of one or more steps of a method 200. FIG. 3 additionally or alternatively may be described as schematically representing, or illustrating, the flow of materials through a manufacturing facility, with the flow of materials ultimately resulting in a stiffened composite structure 12, and optionally resulting in a fully assembled apparatus 10. In FIGS. 3-12, some elements are illustrated in dashed lines, schematically representing that such elements may be optional or may correspond to an optional version of a system 100 and/or method 200. That said, not all systems 100 and methods 200 are required to include the elements illustrated in solid lines. The schematic representation of systems 100 and methods 200 in FIGS. 3-12 are not limiting and other systems 100, component parts of systems 100, methods 200, and steps of methods 200 are within the scope of the present disclosure, including systems 100 having greater than or fewer than the number of illustrated elements, as well as methods 200 having greater than or fewer than the number of illustrated steps, as understood from the discussions herein. As also understood from the discussions herein, methods 200 are not required to have the schematically represented steps of FIG. 4 performed in the order illustrated.

With initial reference to FIG. 3, a system 100 may include a supply 102 of stiffeners 32, one or more stiffener loading tools 106, an inner mold line layup mandrel 108, and a supply 110 of skin segments 38. A stiffener loading tool 106 is a tool that is configured to load, or attach, a stiffener 32 onto the inner mold line layup mandrel 108.

Additionally, in some embodiments, a system 100 further may include one or more of one or more stiffener transporting tools 104, a supply 114 of composite stiffener plies 116, one or more stiffener forming tools 118, one or more skin loading tools 120, a supply 122 of adhesive 124, and a curing oven, or autoclave, 126. A stiffener transporting tool 104 is a tool that is configured to transport, or transfer, a stiffener 32 from one location to another, such as from the supply 102 to a stiffener loading tool 106 and/or to the inner mold line layup mandrel 108. In some systems 100, the stiffener transporting tool 104 may be combined with the stiffener loading tool 106, either selectively or permanently, with these optional configurations being schematically illustrated in FIG. 3 at 112. That is, in some embodiments, the stiffener loading tool 106 also may be configured to transport stiffeners 32. Additionally or alternatively, a stiffener transporting tool 104 may be separate and distinct from a stiffener loading tool 106, but the two tools may be configured to be coupled together and utilized together. For example, a stiffener loading tool 106 may be configured to operatively receive a stiffener transporting tool 104 with a stiffener 32 and with the stiffener transporting tool 104 to operatively load the stiffener 32 onto the inner mold line layup mandrel 108. Sated differently, the stiffener transporting tool 104 may be configured to be operatively and selectively coupled to and decoupled from the stiffener loading tool 106.

A stiffener forming tool 118 is a tool that is configured to form the supply 102 of stiffeners 32, for example, from the supply 114 of composite stiffener plies 116. A skin loading tool 120 is a tool that is configured to operatively load a skin segment 38 onto the inner mold line layup mandrel 108 and into operative engagement with a plurality of stiffeners 32 pre-loaded on the inner mold line layup mandrel 108. Adhesive 124, when utilized, may take any suitable form, and may be configured to operatively affix stiffeners 32 and/or skin segments 38 to the inner mold line layup mandrel 108. A curing oven, or autoclave, 126 is a tool that is configured to receive a stiffened composite structure 12 and to cure the stiffened composite structure 12.

Some embodiments of stiffened composite structures 12, including the skin 30 and the stiffeners 32, may be constructed of fiber reinforced composite material. Fiber reinforced composite materials additionally or alternatively may be described as or referred to as fiber reinforced polymers, or plastics. As used herein, a fiber reinforced composite material should be understood to include at least an epoxy or other polymer or binding material together with fibers, such as (but not limited to) carbon fibers, boron fibers, para-aramid (e.g., Kevlar®) fibers, and/or other fibers. In some embodiments, the fibers may be woven into a fabric. In some embodiments, the skin 30 and/or the stiffeners 32 may be constructed of multiple layers, or plies, of fiber reinforced composite material. In some such embodiments, the plies may be pre-preg plies, which are layers, or sheets, of fibers that are pre-impregnated with the associated binding material. Accordingly, multiple pre-preg plies may be layered to collectively define a segment of fiber reinforced composite material having desired properties and characteristics. The binding material of pre-preg plies may be partially cured, or pre-cured, so as to permit handling of the plies and selective assembly of the plies. Typically, partially cured pre-preg plies are tacky to the touch and therefore easily stick together when layered, but not necessarily in a permanent fashion. That is, when layered, two adjacent plies may be permitted to translate laterally relative to each other and/or may be able to be separated, if so desired. To more permanently affix adjacent layers of plies together, the layered plies may be compacted, or compressed, together, utilizing any suitable method and at any suitable and various times during the construction of a fiber reinforced composite structure. This compression of two more layers is referred to as compaction, or as compacting, of the plies.

As an illustrative, non-exclusive example, a plurality of composite stiffener plies 116 may be layered to form a flat sheet, or blank, for forming a stiffener 32. The mere layering of the composite stiffener plies 116 and the weight associated with the composite stiffener plies 116 may result in some compaction of the composite stiffener plies 116, at least to the extent that they stick together and then may be handled as a single unit. Additionally or alternatively, the layered composite stiffener plies 116 may be physically compressed with a tool. Then, the flat sheet of layered composite stiffener plies 116 may be formed into the shape of a stiffener 32 utilizing a stiffener forming tool 118, resulting in further compaction of the composite stiffener plies 116. In some systems 100 and methods 200, the composite stiffener plies 116 may be further compacted by a stiffener transporting tool 104. Additionally or alternatively, the composite stiffener plies 116 may be further compacted when loaded onto the inner mold line layup mandrel 108 by a stiffener loading tool 106. Additionally or alternatively, the composite stiffener plies 116, or at least portions thereof, may be further compacted when a skin segment 38 is loaded onto the inner mold line layup mandrel 108. Additionally or alternatively, the composite stiffener plies 116 may be further compacted when the stiffened composite structure 12 is cured in a curing oven, or autoclave, 126.

Turning now to FIG. 4, but with continued reference to FIG. 3, a method 200 of assembling a stiffened composite structure 12 may include providing a supply 102 of stiffeners 32 and a supply 110 of skin segment 38, as indicated at 202; loading, with a stiffener loading tool 106, a respective stiffener 32 from the supply 102 of stiffeners 32 onto the inner mold line layup mandrel 108; repeating the loading 208 to load a plurality of stiffeners 32 onto the inner mold line layup mandrel, as indicated at 210; and then after the repeating 210, affixing a respective skin segment 38 from the supply 110 of skin segments 38 to the plurality of stiffeners 32 that are loaded on the inner mold line layup mandrel 108 to form at least a portion of the stiffened composite structure 12, as indicated as 212.

In some methods 200, such as that are associated with stiffened composite structures 12 having hat-shaped, or similar, stiffeners 32, following the loading 208 and prior to the affixing 210, the cavity defined by the loaded stiffener 32 may be filled with an appropriate structure or structures, with such structures including a stiffener mandrel, or bladder, and associated noodles. As a result, when a skin segment 38 is loaded onto the inner mold line layup mandrel 108, the skin segment will engage the stiffener mandrel or mandrels.

With systems 100 that include a stiffener transporting tool 104 that is separate and distinct from a stiffener loading tool 106, a method 200 may further include transporting, with the stiffener transporting tool 104, a respective stiffener 32 from the supply 102 of stiffeners 32 to a stiffener loading tool 106, as indicated optionally at 204; and then following the transporting 204, coupling the stiffener transporting tool 104 to the stiffener loading tool 106, as indicated optionally at 206 in FIG. 4 and as represented in FIG. 3 at 112. Then, following the coupling 206, the respective stiffener 32 may be loaded onto the inner mold line layup mandrel 108 with the stiffener transporting tool 104 and the stiffener loading tool 106 in combination. Then, as indicated at 211, the transporting 204, the coupling 206, and the loading 208 may be repeated, resulting in multiple stiffeners 32 being loaded onto the inner mold line layup mandrel 108.

Figures 5, 6:
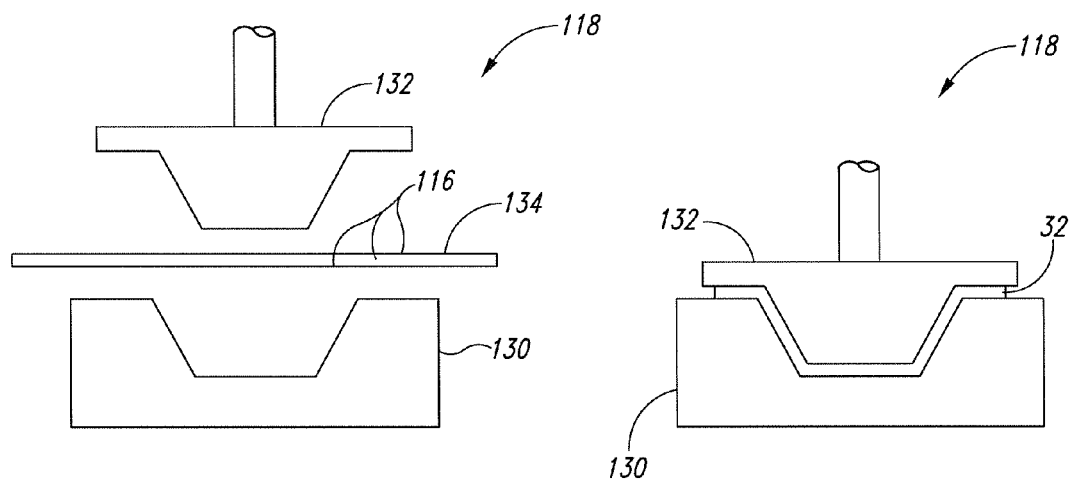
FIG. 5 is a schematic exploded representation of a stiffener forming tool, together with a plurality of composite plies for forming a stiffener.
FIG. 6 is a schematic representation of the stiffener forming tool of FIG. 4, with the plurality of composite plies formed into a stiffener.

In some methods 200, the providing 202 of the supply 102 of stiffeners 32 may include forming the stiffeners 32, such as utilizing a stiffener forming tool 118. FIGS. 5-6 schematically illustrate the forming of a stiffener 32 with a stiffener forming tool 118. As schematically illustrated, a stiffener forming tool 118 may include a stiffener mold, or form, 130 and a die, or punch, 132. The mold 130 and die 132 are configured to form a stiffener 32 from a sheet, or blank, 134 of composite stiffener plies 116. In the illustrated example, the stiffener forming tool 118 is configured to form a hat-shaped stiffener 32; however, any suitable and desired shape of stiffener 32 may be formed. Illustrative, non-exclusive examples of stiffeners 32 include those having hat-shaped, reverse hat-shaped, Z-shaped, I-shaped, and J-shaped cross-sectional profiles.

In some methods 200, the forming of stiffeners 32 may be performed simultaneously, or concurrently, with one or more of the loading 208 and the affixing 212 and/or with the optional transporting 204 and coupling 206. Accordingly, while a first stiffener 32 is being transported to and loaded onto the inner mold line layup mandrel 108, a subsequent stiffener 32 may be formed and be ready for subsequent transporting and loading onto the inner mold line layup mandrel 108 following the loading of a prior stiffener 32.

In some methods 200, the optional transporting 204 may include compacting the stiffener 32 that is being transported. In some such methods 200, the compacting may include vacuum compacting the stiffener 32 that is being transported. Additionally or alternatively, in some methods 200, the transporting 204 may include suctioning the stiffener 32 to the stiffener transporting tool 104.

Figures 7, 8:
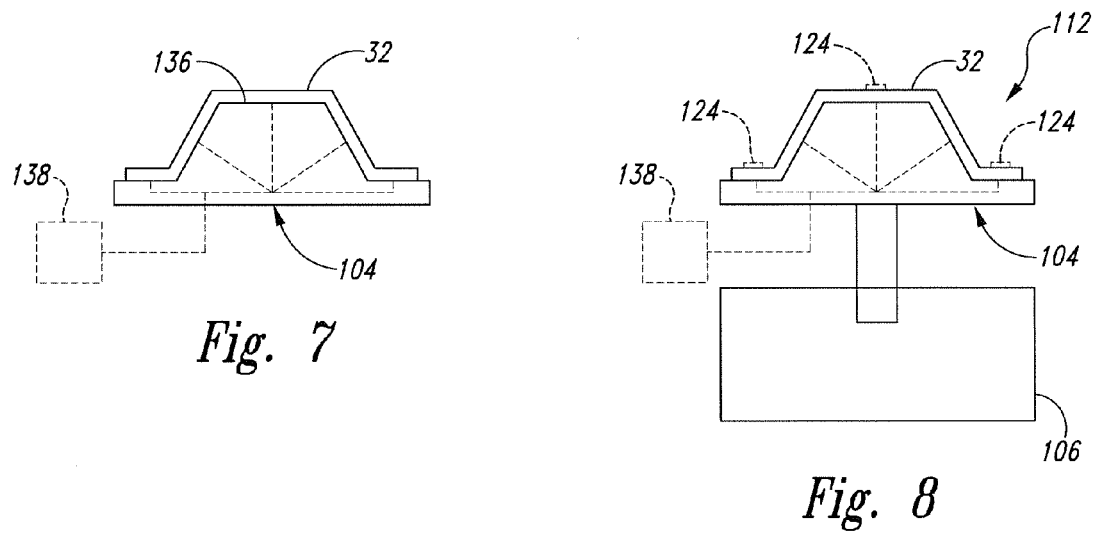
FIG. 7 is a schematic representation of a stiffener transporting tool, together with a formed stiffener.
FIG. 8 is a schematic representation of a combination of a stiffener transporting tool and a stiffener loading tool, together with a formed stiffener.

FIG. 7 schematically illustrates a stiffener transporting tool 104, together with an associated stiffener 32 being transported by the stiffener transporting tool 104. In some embodiments, the stiffener transporting tool 104 defines a stiffener engagement surface 136 that is shaped to correspond to one side of a particularly configured stiffener 32. Again, in the illustrated example, the stiffener 32 is illustrated as a hat-shaped stiffener 32, but stiffener transporting tools 104 may be configured to correspond with any suitable and desired configuration of stiffeners 32. Some embodiments of stiffener transporting tools 104 may be configured to suction a stiffener 32 to the stiffener transporting tool 104. In FIG. 7, an optional suction, or vacuum, system 138 is illustrated schematically in operative communication with the stiffener engagement surface 136 and thus as operatively configured to suction a stiffener 32 to the stiffener engagement surface 136. Stiffener transporting tools 104 that include an optional suction system 138 additionally or alternatively may be described as a stiffener compacting tool or as a combined compacting and transporting tool. Illustrative, non-exclusive examples of stiffener transporting tools 104 that may be utilized with and/or modified for systems 100 and methods 200 are disclosed in co-owned U.S. patent application Ser. No. 13/626,452, filed on Sep. 25, 2012 and entitled COMPACTION SYSTEM FOR COMPOSITE STRINGERS, the disclosure of which is incorporated herein by reference.

Figure 9:
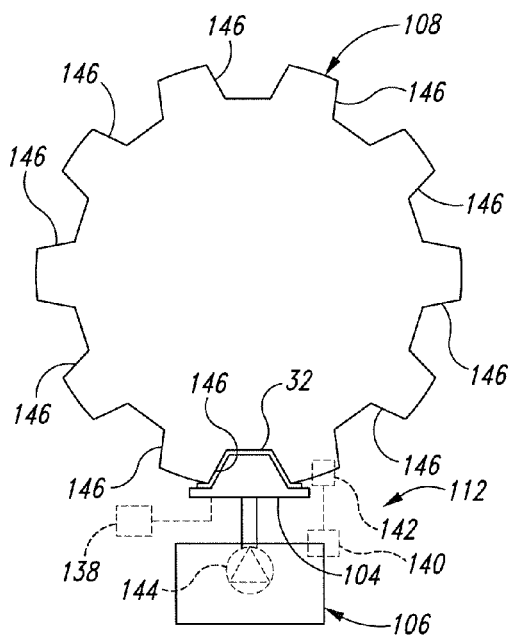
FIG. 9 is a schematic representation of the combination of FIG. 8, together with an inner mold line layup mandrel, schematically illustrating the loading of the formed stiffener onto the layup mandrel.

In some methods 200, the optional coupling 206 may include coupling the stiffener transporting tool 104 to an upper side of the stiffener loading tool 106, such as schematically illustrated in the example of FIGS. 8-9. Accordingly, the stiffener loading tool 106 may be configured to be operatively positioned underneath the inner mold line layup mandrel 108 and to raise the stiffener transporting tool 104 and the associated stiffener 32 until the stiffener 32 operatively engages the inner mold line layup mandrel 108. That is, in some methods 200, the loading 208 may include positioning the stiffener loading tool 106 together with the stiffener transporting tool 104 vertically underneath the inner mold line layup mandrel 108 and raising the stiffener transporting tool 104 with the stiffener loading tool 106 until the stiffener 32 operatively engages the inner mold line layup mandrel 108, as schematically illustrated in FIG. 9.

Figure 10:
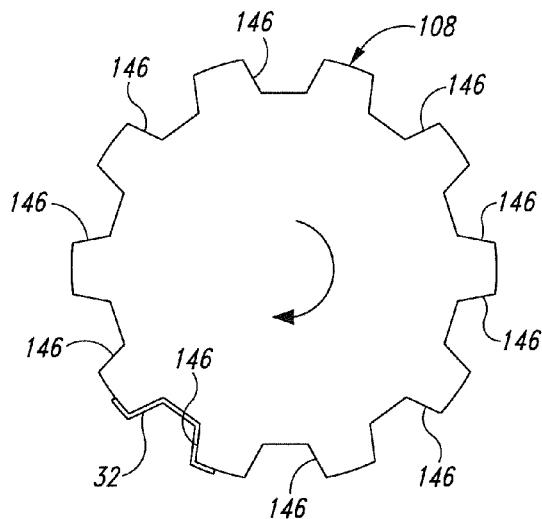
FIG. 10 is a schematic representation of an inner mold line layup mandrel, together with a loaded stiffener, being rotated for loading of a second formed stiffener.
Figure 11:
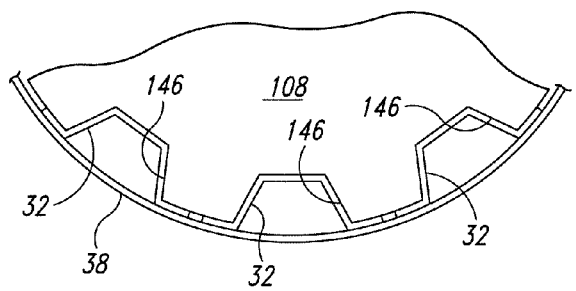
FIG. 11 is a schematic representation of an inner mold line layup mandrel having a plurality of loaded stiffeners, together with a skin segment applied to the stiffeners.

Prior to the loading 208, some methods 200 further include applying an adhesive 124 to the stiffener 32 that is being loaded onto the inner mold line layup mandrel 108, as schematically and optionally illustrated in FIG. 8 and as schematically and optionally represented in FIG. 3. As an illustrative, non-exclusive example, one or more adhesive strips may be applied to the side of the stiffener 32 that will engage the inner mold line layup mandrel 108 when it is loaded. As a result of the adhesive 124, the stiffener 32 will be selectively retained onto the inner mold line layup mandrel 108, as illustrated in FIG. 10, so that subsequent stiffeners 32 also may be loaded onto the inner mold line layup mandrel 108, and so that a skin segment 38 subsequently may be loaded onto the inner mold line layup mandrel 108 and the multiple loaded stiffeners 32, as illustrated in FIG. 11. Additionally or alternatively, in some systems 100 and methods 200, adhesive 123 may be applied to the inner mold like layup mandrel 108, such as within a stiffener form 146, into which a stiffener 32 is to be loaded.

As schematically illustrated in FIG. 9, in some systems 100, the stiffener loading tool 106 includes a loading tool alignment structure 140 and the inner mold line layup mandrel 108 includes a mandrel alignment structure 142 that is configured to engage the loading tool alignment structure 140 for alignment of the stiffener loading tool 106 with the inner mold line layup mandrel 108 for operative loading of a stiffener 32 onto the inner mold line layup mandrel 108. Accordingly, in some methods 200, the loading 208 may include operatively aligning the stiffener loading tool 106 (and/or the stiffener transporting tool 104) with the inner mold line layup mandrel 108. As an illustrative, non-exclusive example, one of the loading tool alignment structure 140 and the mandrel alignment structure 142 may include one or more alignment pins and the other of the loading tool alignment structure 104 and the mandrel alignment structure 142 may include one or more corresponding alignment bores configured to receive the one or more alignment pins. Additionally or alternatively, as schematically illustrated in FIG. 9 at 144, the stiffener loading tool 106 may be configured to pivot the stiffener transporting tool 104 for operative alignment with the inner mold line layup mandrel 108. In some such embodiments, the stiffener loading tool 106 may be described as including a gimbal device 144 or a pivot device 144.

In some methods 200, prior to the repeating 210 or 211, the inner mold line layup mandrel 108 may be rotated in order to position the inner mold line layup mandrel 108 for subsequent loading of another stiffener 32, as schematically illustrated in FIG. 10. In other words, the inner mold line layup mandrel 108 may be configured to be rotated after each loading of a stiffener 32 onto the inner mold line layup mandrel 108.

In the illustrated example of FIGS. 9-10, an illustrative, non-exclusive example of an inner mold line layup mandrel 108 is presented schematically and is generally cylindrical, corresponding to a generally cylindrical stiffened composite structure 12 that includes a plurality of hat-shaped stiffeners 32 in the form of stingers 36 that extend longitudinally along and that are spaced circumferentially around the stiffened composite structure 12; however, as discussed herein, other configurations of stiffened composite structures 12, and thus of corresponding systems 100 and component parts thereof, are within the scope of the present disclosure. With reference to the illustrative, non-exclusive schematic example of FIGS. 9-10, an inner mold line layup mandrel 108 may be described as including a plurality of spaced-apart stiffener forms 146, with each stiffener form 146 having an outer surface that corresponds to one side of a respective stiffener 32 that is to be loaded into a respective stiffener form 146. Accordingly, in some methods 200, the loading 208 may include loading a stiffener 32 onto, or within, a respective stiffener form 146. The schematic representation of the inner mold line layup mandrel 108 is not illustrated to scale, and as an illustrative, non-exclusive example, an inner mold line layup mandrel 108 that is configured for assembly of fuselages 16 may include more than 20, more than 50, more than 75, or even more than 100 stiffener forms 146 corresponding to a plurality of stringers 36.

Figure 12:
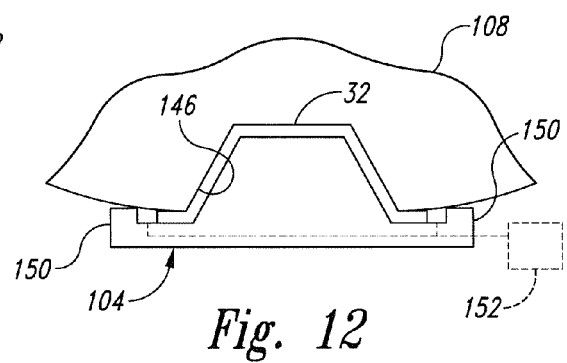
FIG. 12 is a schematic representation of a combination stiffener transporting and stiffener compacting tool, together with an inner mold line layup mandrel.

In some methods 200, following the loading 208 and prior to the affixing 212, a loaded stiffener 32 may be compacted onto the inner mold line layup mandrel 108. Additionally or alternatively, in some methods 200, the loading 208 may be described as including the compacting of the loaded stiffener 32 onto the inner mold line layup mandrel 108. In some such methods 200 and in some systems 100, the compacting of a loaded stiffener 32 may be performed by the stiffener transporting tool 104. FIG. 12 schematically illustrates a stiffener transporting tool 104 in the form of a combined compacting and transporting tool 104. A combined compacting and transporting tool 104 optionally may be configured to vacuum compact the stiffener 32 onto the inner mold line layup mandrel 108. Accordingly, in FIG. 12, the combined compacting and transporting tool 104 is schematically illustrated as including compaction structure 150 that is configured to compact the stiffener 32 to the inner mold line layup mandrel 108. In some embodiments, the compaction structure 150 may be configured to seal around the outer perimeter of the loaded stiffener 32 and to vacuum compact the loaded stiffener 32 to the inner mold line layup mandrel 108. Accordingly, as schematically illustrated in FIG. 12, the compaction structure 150 may be configured to be operatively coupled to a vacuum system 152 for applying a vacuum between the combined compacting and transporting tool 104 and the inner mold line layup mandrel 108. In some embodiments, the vacuum system 152 may be distinct from the vacuum system 138. Because the combined compacting and transporting tool 104 itself seals against the inner mold line layup mandrel, a typical bagging process may not be utilized or needed. Moreover, a single stiffener 32 may be compacted to the inner mold line layup mandrel 108 at a time utilizing the combined compacting and transporting tool 104, avoiding the labor and time intensive process of loading several stiffeners 32, bagging the several stiffeners 32, and then vacuum compacting the several stiffeners 32, all the while taking up valuable space and time with the inner mold line layup mandrel 108.

As discussed herein, some systems 100 include more than one stiffener transporting tool 104 and/or more than one stiffener loading tool 106. Accordingly, to efficiently assemble a stiffened composite structure 12, multiple stiffeners 32 may be sequentially transported to and loaded onto the inner mold line layup mandrel 108, without requiring use of the same stiffener transporting tool 104 and/or the same stiffener loading tool 106 for each and every stiffener 32 being loaded. Additionally or alternatively, a single stiffener loading tool 106 may be provided and configured for repeated positioning for the coupling 206 of a stiffener transporting tool 104 from a plurality of stiffener transporting tools 104 and for positioning underneath the inner mold line layup mandrel 108 for the loading 208.

In some methods 200, the providing 202 of the skin segments 38 may include forming the skin segments 38. In some such methods 200, the providing 202 may further include providing a supply of composite skin plies 148. Illustrative, non-exclusive examples of suitable methods of forming skin segments 38, together with associated systems, are disclosed in co-owned U.S. patent application Ser. No. 13/693,887, filed on Dec. 4, 2012 and entitled SYSTEMS AND METHODS FOR ASSEMBLING A SKIN OF A COMPOSITE STRUCTURE, the disclosure of which is incorporated herein by reference.

As optionally and schematically indicated in FIG. 4 at 214, some methods 200 further may include following the affixing 212, curing the stiffened composite structure 12, for example, in a curing oven or autoclave 126 of a system 100.

As discussed, some apparatuses 10 may include several stiffened composite structures 12 that are assembled together to collectively define the apparatus 10 or a greater stiffened composite structure 12. Aircraft 14 and fuselages 16 are such examples, with an illustrative, non-exclusive example of a fuselage 16 having more than one barrel section 18. Accordingly, as optionally and schematically indicated in FIG. 4 at 216, some methods 200 further may include following the affixing, again repeating 210 the loading 208 (and in some methods, also the transporting 204 and the coupling 206 at 211), as many times as necessary to form another portion of a stiffened composite structure 12. Following the formation of multiple formed portions of a stiffened composite structure 12, the multiple formed portions may be assembled together, as schematically indicated at 218. Depending on the size of the stiffened composite structure 12 and/or the portions thereof, each portion may be cured prior to final assembly, such as schematically represented in FIG. 4 at 218, or, multiple portions may first be assembled, and the entire assembly may be cured.

Figure 13:
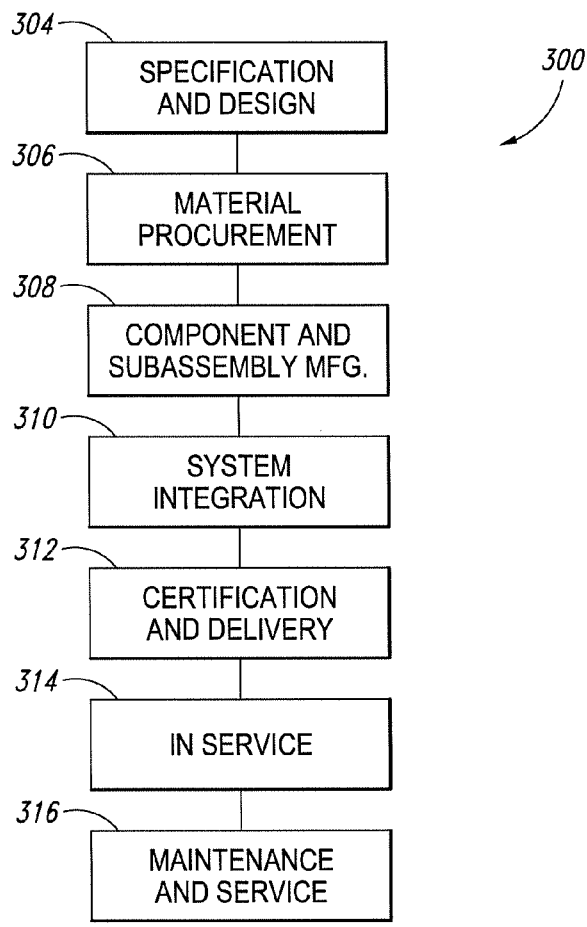
FIG. 13 is a flowchart schematically representing aircraft production and service methodology.
Figure 14:
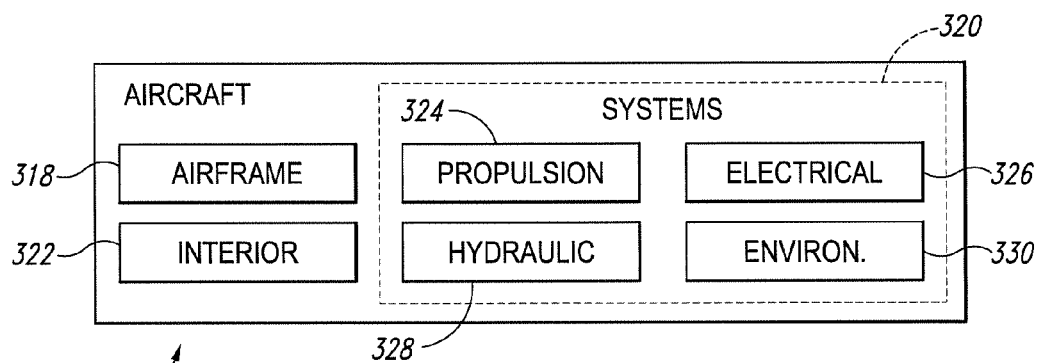
FIG. 14 is a block diagram schematically representing an aircraft.

Turning now to FIGS. 13-14, embodiments of the present disclosure may be described in the context of an aircraft manufacturing and service method 300 as shown in FIG. 13 and an aircraft 14 as shown in FIG. 14. During pre-production, exemplary method 300 may include specification and design 304 of the aircraft 14 and material procurement 306. During production, component and subassembly manufacturing 308 and system integration 310 of the aircraft 14 takes place. Thereafter, the aircraft 14 may go through certification and delivery 312 in order to be placed in service 314. While in service by a customer, the aircraft 14 is scheduled for routine maintenance and service 316 (which may also include modification, reconfiguration, refurbishment, and so on).

Each of the processes of method 300 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 14, the aircraft 14 produced by exemplary method 300 may include an airframe 318 with a plurality of systems 320 and an interior 322. Examples of high-level systems 320 include one or more of a propulsion system 324, an electrical system 326, a hydraulic system 328, and an environmental system 330. Any number of other systems also may be included. Although an aerospace example is shown, the principles of the inventions disclosed herein may be applied to other industries, such as the automotive industry.

Apparatus and methods disclosed herein may be employed during any one or more of the stages of the production and service method 300. For example, components or subassemblies corresponding to production process 308 may be fabricated or manufactured in a manner similar to components or subassemblies produced while the aircraft 14 is in service. Also, one or more apparatus embodiments, method embodiments, or a combination thereof may be utilized during the production stages 308 and 310, for example, by substantially expediting assembly of or reducing the cost of an aircraft 14. Similarly, one or more of apparatus embodiments, method embodiments, or a combination thereof may be utilized while the aircraft 14 is in service, for example and without limitation, to maintenance and service 316.

Illustrative, non-exclusive examples of inventive subject matter according to the present disclosure are described in the following enumerated paragraphs:

A. A method of assembling a stiffened composite structure, comprising:
  providing a supply of stiffeners;
  providing a supply of skin segments;
  loading, with a stiffener loading tool, a respective stiffener from the supply of stiffeners onto an inner mold line layup mandrel;
  repeating the loading to load a plurality of stiffeners onto the inner mold line layup mandrel; and
  following the repeating the loading, affixing a respective skin segment from the supply of skin segments to the plurality of stiffeners loaded on the inner mold line layup mandrel to form at least a portion of the stiffened composite structure.

A1. The method of paragraph A, further comprising:
  prior to the loading, transporting, with a stiffener transporting tool, the respective stiffener from the supply of stiffeners; and
  following the transporting, coupling the stiffener transporting tool to the stiffener loading tool;
  wherein the loading includes loading, with the stiffener transporting tool and the stiffener loading tool, the respective stiffener onto the inner mold line layup mandrel; and
  wherein the repeating further includes repeating the transporting and the coupling to load the plurality of stiffeners onto the inner mold line layup mandrel.

A1.1. The method of paragraph A1, wherein the transporting includes compacting the respective stiffener, and optionally vacuum compacting the respective stiffener.

A1.2. The method of any of paragraphs A1-A1.1, wherein the transporting includes suctioning the respective stiffener to the stiffener transporting tool.

A1.3. The method of any of paragraphs A1-A1.2, wherein the stiffener transporting tool defines a stiffener engagement surface that is shaped to correspond to one side of the respective stiffener.

A1.4. The method of any of paragraphs A1-A1.3, wherein the stiffener transporting tool is configured to suction the respective stiffener to the stiffener transporting tool for the transporting.

A1.5. The method of any of paragraphs A1-A1.4, wherein the stiffener transporting tool includes any suitable structure disclosed in U.S. patent application Ser. No. 13/626,452.

A1.6. The method of any of paragraphs A1-A1.5, wherein the coupling includes coupling the stiffener transporting tool to an upper side of the stiffener loading tool.

A1.7. The method of any of paragraphs A1-A1.6,
wherein the transporting includes transporting the respective stiffener with a respective stiffener transporting tool from a plurality of stiffener transporting tools; and
optionally wherein the coupling includes coupling the respective stiffener transporting tool to a respective stiffener loading tool from a plurality of stiffener loading tools, optionally wherein the coupling results in more than one combination of a respective stiffener transporting tool and a respective stiffener loading tool being ready for loading a respective stiffener onto the inner mold line layup mandrel.

A2. The method of any of paragraphs A-A1.7, further comprising:
prior to the loading, applying an adhesive to one side of the respective stiffener, optionally wherein the adhesive includes one or more adhesive strips;
wherein the loading includes adhering the respective stiffener to the inner mold line layup mandrel with the adhesive.

A3. The method of any of paragraphs A-A2, wherein the loading includes:
positioning the stiffener loading tool vertically underneath the inner mold line layup mandrel; and
raising the respective stiffener with the stiffener loading tool until the respective stiffener operatively engages the inner mold line layup mandrel.

A4. The method of any of paragraphs A-A3, wherein the loading includes:
operatively aligning the stiffener loading tool with the inner mold line layup mandrel, optionally wherein the operatively aligning includes engaging an alignment pin with an alignment bore.

A5. The method of any of paragraphs A-A4, further comprising:
following the loading, compacting the respective stiffener on the inner mold line layup mandrel, optionally (when depending from paragraph A1) wherein the compacting is performed with the stiffener transporting tool, optionally wherein the compacting includes vacuum compacting, optionally wherein the compacting includes compacting only a single stiffener at a time, and optionally, wherein the compacting does not utilize a bagging process;
wherein the repeating includes repeating the compacting.

A5.1. The method of paragraph A5 when depending from paragraph A1, further comprising:
following the loading and prior to the compacting, decoupling the stiffener transporting tool from the stiffener loading tool.

A6. The method of any of paragraphs A-A5.1, further comprising:
prior to the repeating, rotating the inner mold line layup mandrel to position the inner mold line layup mandrel for subsequent loading of a respective stiffener.

A7. The method of any of paragraphs A-A6,
wherein the inner mold line layup mandrel includes a plurality of spaced-apart stiffener forms, each stiffener form having an outer surface that corresponds to one side of a respective stiffener; and
wherein the loading includes loading the respective stiffener onto a respective stiffener form.

A8. The method of any of paragraphs A-A7, wherein the providing the supply of stiffeners includes forming the stiffeners.

A8.1. The method of paragraph A8,
wherein the providing the supply of stiffeners further includes providing a supply of composite stiffener plies; and
wherein the forming the stiffeners includes:
forming a respective stiffener from a respective subset of composite stiffener plies from the supply of composite stiffener plies; and
repeating the forming a respective stiffener to form multiple stiffeners, optionally wherein the repeating is performed to form two or more stiffeners simultaneously.

A8.2. The method of any of paragraphs A8-A8.1, wherein the forming the stiffeners is performed simultaneously with one or more of the loading and the affixing (and optionally when depending from paragraph A1, the transporting and the coupling), to have multiple stiffeners ready for loading onto the inner mold line layup mandrel.

A9. The method of any of paragraphs A-A8.2, wherein the affixing includes any suitable method disclosed in U.S. patent application Ser. No. 13/693,887.

A10. The method of any of paragraphs A-A9, wherein the providing the supply of skin segments includes forming the skin segments.

A10.1. The method of paragraph A10,
wherein the providing the supply of skin segments further includes providing a supply of composite skin plies; and
wherein the forming the skin segments includes:
forming a respective skin segment from a respective subset of composite skin plies from the supply of composite skin plies; and
repeating the forming a respective skin segment to create the supply of skin segments.

A10.2. the method of any of paragraphs A10-A10.1, wherein the forming the skin segments is performed simultaneously with the loading and the affixing to have multiple skin segments ready for loading onto the inner mold line layup mandrel.

A11. The method of any of paragraphs A-A10.2, further comprising:
following the affixing, curing the at least a portion of the stiffened composite structure.

A12. The method of any of paragraphs A-A11, further comprising:
following the affixing, repeating the repeating the loading and repeating the affixing to form at least a portion of the stiffened composite structure.

A12.1. The method of paragraph A12, further comprising:
following the repeating the repeating the loading and repeating the affixing, assembling a plurality of formed portions of the stiffened composite structure to form the stiffened composite structure.

A13. The method of any of paragraphs A-A12.1, wherein the stiffened composite structure includes one of a barrel section of an aircraft fuselage, an aircraft fuselage, a wing section of an aircraft, a wing of an aircraft, a stabilizer section of an aircraft, a stabilizer of an aircraft, a structural section of an aircraft, and an aircraft.

A14. The method of any of paragraphs A-A13, wherein the stiffeners include stringers.

A15. The method of any of paragraphs A-A14, wherein the stiffeners are constructed of fiber reinforced composite material, and optionally when depending from paragraph A8.1 wherein the composite stiffener plies include pre-preg composite stiffener plies.

A16. The method of any of paragraphs A-A15, wherein the skin segments are constructed of fiber reinforced composite material, and optionally when depending from paragraph A10.1 wherein the composite skin plies include pre-preg composite skin plies.

A17. The method of any of paragraphs A-A16, wherein the method utilizes the system of any of paragraphs C-C14.

B. A stiffened composite structure constructed using the method of any of paragraphs A-A23, optionally wherein the stiffened composite structure includes one of a barrel section of an aircraft fuselage, an aircraft fuselage, a wing section of an aircraft, a wing of an aircraft, a stabilizer section of an aircraft, a stabilizer of an aircraft, a structural section of an aircraft, and an aircraft.

C. A system for assembling stiffened composite structures, comprising:
a supply of stiffeners;
an inner mold line layup mandrel; and
a stiffener loading tool configured to load a respective stiffener from the supply of stiffeners onto the inner mold line layup mandrel.

C1. The system of paragraph C, further comprising:
a supply of skin segments; and
a skin segment loading tool configured to load a respective skin segment from the supply of skin segments onto the inner mold line layup mandrel and onto a plurality of stiffeners loaded on the inner mold line layup mandrel.

C1.1. The system of paragraph C1, wherein the skin segment loading tool includes any suitable structure disclosed in U.S. patent application Ser. No. 13/693,887.

C2. The system of any of paragraphs C-C1.1, further comprising:
a stiffener forming tool configured to form the supply of stiffeners.

C2.1. The system of paragraph C2, further comprising:
a supply of composite stiffener plies, optionally pre-preg composite stiffener plies;
wherein the stiffener forming tool is configured to form a respective stiffener from a subset of composite stiffener plies from the supply of composite stiffener plies.

C3. The system of any of paragraphs C-C2.1, further comprising:
a stiffener transporting tool configured to transport a respective stiffener from the supply of stiffeners;
wherein the stiffener loading tool is further configured to operatively receive the stiffener transporting tool with the respective stiffener and with the stiffener transporting tool to operatively load the respective stiffener onto the inner mold line layup mandrel.

C3.1. The system of paragraph C3, wherein the stiffener transporting tool includes a compaction structure that is configured to compact the respective stiffener, and optionally vacuum compact the respective stiffener.

C3.1.1. The system of paragraph C3.1, wherein the compaction structure is further configured to compact the respective stiffener to the inner mold line layup mandrel after the respective stiffener is loaded onto the inner mold line layup mandrel, optionally wherein the compaction structure is configured to compact only a single stiffener at a time, and optionally, wherein the compaction structure does not utilize a typical bagging process.

C3.2. The system of any of paragraphs C3-C3.1.1, wherein the stiffener transporting tool includes a suction structure that is further configured to suction the respective stiffener to the stiffener transporting tool.

C3.3. The system of any of paragraphs C3-C3.2, wherein the stiffener transporting tool defines a stiffener engagement surface that is shaped to correspond to one side of the respective stiffener.

C3.4. The system of any of paragraphs C3-C3.3, comprising a plurality of stiffener transporting tools configured to be used simultaneously during assembly of the stiffened composite structures.

C3.5. The system of any of paragraphs C3-C3.3, wherein the stiffener transporting tool includes any suitable structure disclosed in U.S. patent application Ser. No. 13/626,452.

C4. The system of any of paragraphs C-C3.5, wherein the stiffener loading tool includes a loading tool alignment structure, wherein the inner mold line layup mandrel includes a mandrel alignment structure configured to engage the loading tool alignment structure for alignment of the stiffener loading tool with the inner mold line layup mandrel for loading of the respective stiffener onto the inner mold line layup mandrel, optionally wherein one of the loading tool alignment structure and the mandrel alignment structure includes an alignment pin and the other of the loading tool alignment structure and the mandrel alignment structure includes an alignment bore.

C5. The system of any of paragraphs C-C4, wherein the stiffener loading tool is configured to be operatively positioned underneath the inner mold line layup mandrel and to raise the respective stiffener (and when depending from paragraph C3, the stiffener transporting tool) until the respective stiffener operatively engages the inner mold line layup mandrel.

C6. The system of any of paragraphs C-C5, further comprising a plurality of stiffener loading tools configured to be used simultaneously during assembly of the stiffened composite structures.

C7. The system of any of paragraphs C-C6, further comprising:
a supply of adhesive configured to be applied to one side of the respective stiffener prior to the respective stiffener being loaded onto the inner mold line layup mandrel, optionally wherein the supply of adhesive includes a plurality of adhesive strips.

C8. The system of any of paragraphs C-C7, wherein the inner mold line layup mandrel includes a plurality of spaced-apart stiffener forms, each stiffener form having an outer surface that corresponds to one side of a respective stiffener.

C9. The system of any of paragraphs C-C8, wherein the inner mold line layup mandrel is configured to rotate after each loading of a respective stiffener onto the inner mold line layup mandrel.

C10. The system of any of paragraphs C-C9, wherein the stiffeners are constructed of fiber reinforced composite material, and optionally of pre-preg composite stiffener plies.

C11. The system of any of paragraphs C1-C10 when depending from paragraph C1, wherein the skin segments are constructed of fiber reinforced composite material, and optionally of pre-preg composite skin plies.

C12. The system of any of paragraphs C-C11, further comprising:

a curing oven, or autoclave, configured to receive the stiffened composite structure and to cure the stiffened composite structure.

C13. The system of any of paragraphs C-C12, wherein the system is used to perform the method of any of paragraphs A-A17.

C14. The system of any of paragraphs C-C13, wherein the system is configured to construct one of a barrel section of an aircraft fuselage, an aircraft fuselage, a wing section of an aircraft, a wing of an aircraft, a stabilizer section of an aircraft, a stabilizer of an aircraft, a structural section of an aircraft, and an aircraft.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

In the event that any of the patent documents that are incorporated by reference herein define a term in a manner that is inconsistent with either the non-incorporated disclosure of the present application or with any of the other incorporated patent documents, the non-incorporated disclosure of the present application shall control with respect to the present application, and the term or terms as used in an incorporated patent document shall only control with respect to the document in which the term or terms are defined.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A method of assembling a stiffened composite structure, comprising:
    providing a supply of stiffeners;
    providing a supply of skin segments;
    loading, with a stiffener loading tool, a respective stiffener from the supply of stiffeners onto an inner mold line layup mandrel, wherein the loading includes:
        positioning the stiffener loading tool vertically underneath the inner mold line layup mandrel; and
        raising the respective stiffener with the stiffener loading tool until the respective stiffener operatively engages the inner mold line layup mandrel;
    repeating the loading to load a plurality of stiffeners onto the inner mold line layup mandrel; and
    following the repeating the loading, affixing a respective skin segment from the supply of skin segments to the plurality of stiffeners loaded on the inner mold line layup mandrel to form at least a portion of the stiffened composite structure.

2. The method of claim 1, further comprising:
    prior to the repeating, rotating the inner mold line layup mandrel to position the inner mold line layup mandrel for subsequent loading of a respective stiffener.

3. The method of claim 1,
    wherein the inner mold line layup mandrel includes a plurality of spaced-apart stiffener forms, each stiffener form having an outer surface that corresponds to one side of a respective stiffener; and
    wherein the loading includes loading the respective stiffener onto a respective stiffener form.

4. The method of claim 1, wherein the loading includes:
    operatively aligning the stiffener loading tool with the inner mold line layup mandrel, wherein the operatively aligning includes engaging an alignment pin with an alignment bore.

5. The method of claim 1, further comprising:
    following the affixing, repeating the repeating the loading and repeating the affixing to form at least a portion of the stiffened composite structure; and
    following the repeating the repeating the loading and repeating the affixing, assembling a plurality of formed portions of the stiffened composite structure to form the stiffened composite structure.

6. The method of claim 1, wherein the stiffened composite structure includes one of a barrel section of an aircraft fuselage, an aircraft fuselage, a wing section of an aircraft, a wing of an aircraft, a stabilizer section of an aircraft, a stabilizer of an aircraft, a structural section of an aircraft, and an aircraft.

7. The method of claim 1, wherein the stiffeners and the skin segments are constructed of fiber reinforced composite material.

8. A method of assembling a barrel section of an aircraft fuselage, comprising:
    providing a supply of stiffeners constructed of pre-preg fiber reinforced composite material;
    providing a supply of skin segments constructed of pre-preg fiber reinforced composite material;
    applying an adhesive to one side of a respective stiffener from the supply of stiffeners;
    transporting, with a stiffener transporting tool, the respective stiffener;
    following the transporting, coupling the stiffener transporting tool to an upper side of a stiffener loading tool;
    following the coupling:
        positioning the stiffener loading tool vertically underneath an inner mold line layup mandrel; and
        following the positioning, raising the stiffener loading tool and the respective stiffener with the stiffener loading tool until the one side of the respective stiffener and the adhesive operatively engage the inner mold line layup mandrel;

following the positioning, decoupling the stiffener transporting tool from the stiffener loading tool;

following the decoupling, vacuum compacting, with the stiffener transporting tool, the respective stiffener on the inner mold line layup mandrel;

following the decoupling, rotating the inner mold line layup mandrel to position the inner mold line layup mandrel for subsequent loading of a respective stiffener;

repeating the transporting, the positioning, the raising, the decoupling, the vacuum compacting, and the rotating to load and compact a plurality of stiffeners onto the inner mold line layup mandrel; and following the repeating, affixing a respective skin segment from the supply of skin segments to the plurality of stiffeners loaded on the inner mold line layup mandrel to form at least a portion of the barrel section.

9. A method of assembling a stiffened composite structure, comprising:

providing a supply of stiffeners;

providing a supply of skin segments;

transporting, with a stiffener transporting tool, a respective stiffener from the supply of stiffeners;

following the transporting, coupling the stiffener transporting tool to a stiffener loading tool;

loading, with the stiffener transporting tool and the stiffener loading tool, the respective stiffener from the supply of stiffeners onto an inner mold line layup mandrel;

repeating the transporting, the coupling, and the loading to load a plurality of stiffeners onto the inner mold line layup mandrel; and following the repeating the transporting, the coupling, and the loading, affixing a respective skin segment from the supply of skin segments to the plurality of stiffeners loaded on the inner mold line layup mandrel to form at least a portion of the stiffened composite structure.

10. The method of claim 9, wherein the transporting includes suctioning the respective stiffener to the stiffener transporting tool.

11. The method of claim 9, wherein the coupling includes coupling the stiffener transporting tool to an upper side of the stiffener loading tool; and wherein the loading includes:

positioning the stiffener loading tool vertically underneath the inner mold line layup mandrel; and raising the stiffener loading tool and the respective stiffener with the stiffener loading tool until the respective stiffener operatively engages the inner mold line layup mandrel.

12. The method of claim 9, wherein the transporting includes transporting the respective stiffener with a respective stiffener transporting tool from a plurality of stiffener transporting tools; and wherein the coupling includes coupling the respective stiffener transporting tool to a respective stiffener loading tool from a plurality of stiffener loading tools, resulting in more than one combination of a respective stiffener transporting tool and a respective stiffener loading tool being ready for loading a respective stiffener onto the inner mold line layup mandrel.

13. The method of claim 9, further comprising:

following the loading, vacuum compacting, with the stiffener transporting tool, the respective stiffener on the inner mold line layup mandrel;

wherein the repeating includes repeating the vacuum compacting to compact the plurality of stiffeners onto the inner mold line layup mandrel.

14. The method of claim 13, further comprising:

following the loading and prior to the vacuum compacting, decoupling the stiffener transporting tool from the stiffener loading tool.

15. The method of claim 9, further comprising:

prior to the loading, applying an adhesive to one side of the respective stiffener, optionally wherein the adhesive includes one or more adhesive strips;

wherein the loading includes adhering the respective stiffener to the inner mold line layup mandrel with the adhesive.

16. The method of claim 9, wherein the loading includes:

positioning the stiffener loading tool vertically underneath the inner mold line layup mandrel; and raising the respective stiffener with the stiffener loading tool until the respective stiffener operatively engages the inner mold line layup mandrel.

17. The method of claim 9, further comprising:

prior to the repeating, rotating the inner mold line layup mandrel to position the inner mold line layup mandrel for subsequent loading of a respective stiffener.

18. The method of claim 9, wherein the inner mold line layup mandrel includes a plurality of spaced-apart stiffener forms, each stiffener form having an outer surface that corresponds to one side of a respective stiffener; and wherein the loading includes loading the respective stiffener onto a respective stiffener form.

19. The method of claim 9, wherein the providing the supply of stiffeners includes forming the stiffeners, including:

providing a supply of composite stiffener plies;

forming a respective stiffener from a respective subset of composite stiffener plies from the supply of composite stiffener plies; and repeating the forming a respective stiffener to form multiple stiffeners.

20. The method of claim 19, wherein the forming the stiffeners is performed simultaneously with the loading and the affixing to have multiple stiffeners ready for loading onto the inner mold line layup mandrel.

21. The method of claim 9, wherein the providing the supply of skin segments includes forming the skin segments, including:

providing a supply of composite skin plies; and forming a respective skin segment from a respective subset of composite skin plies from the supply of composite skin plies; and repeating the forming a respective skin segment to create the supply of skin segments.

22. The method of claim 21, wherein the forming the skin segments is performed simultaneously with the loading and the affixing to have multiple skin segments ready for loading onto the inner mold line layup mandrel.

23. The method of claim 9, further comprising:

following the affixing, repeating the repeating the loading and repeating the affixing to form at least a portion of the stiffened composite structure; and following the repeating the repeating the loading and repeating the affixing, assembling a plurality of formed portions of the stiffened composite structure to form the stiffened composite structure.

24. The method of claim 9, wherein the stiffened composite structure includes one of a barrel section of an aircraft fuselage, an aircraft fuselage, a wing section of an aircraft, a wing of an aircraft, a stabilizer section of an aircraft, a stabilizer of an aircraft, a structural section of an aircraft, and an aircraft.

25. The method of claim 9, wherein the stiffeners and the skin segments are constructed of fiber reinforced composite material.

26. A system for assembling stiffened composite structures, comprising:
- a supply of stiffeners;
- a supply of skin segments;
- an inner mold line layup mandrel;
- a stiffener transporting tool configured to transport a respective stiffener from the supply of stiffeners, wherein the stiffener transporting tool includes a compaction structure that is configured to vacuum compact the respective stiffener on the inner mold line layup mandrel;
- a stiffener loading tool configured to operatively receive the stiffener transporting tool with the respective stiffener and with the stiffener transporting tool to operatively load the respective stiffener onto the inner mold line layup mandrel; and
- a skin segment loading tool configured to load a respective skin segment from the supply of skin segments onto the inner mold line layup mandrel and onto a plurality of stiffeners loaded on the inner mold line layup mandrel.

27. The system of claim 26, further comprising:
- a stiffener forming tool configured to form the supply of stiffeners; and
- a supply of composite stiffener plies;
- wherein the stiffener forming tool is configured to form a respective stiffener from a subset of composite stiffener plies from the supply of composite stiffener plies.

28. The system of claim 26, wherein the inner mold line layup mandrel is configured to rotate after each loading of a respective stiffener onto the inner mold line layup mandrel.

* * * * *